March 14, 1950 G. W. MERRITT 2,500,371
MOLDING MACHINE FOR CERAMIC WARE
Filed Jan. 2, 1948 5 Sheets-Sheet 1
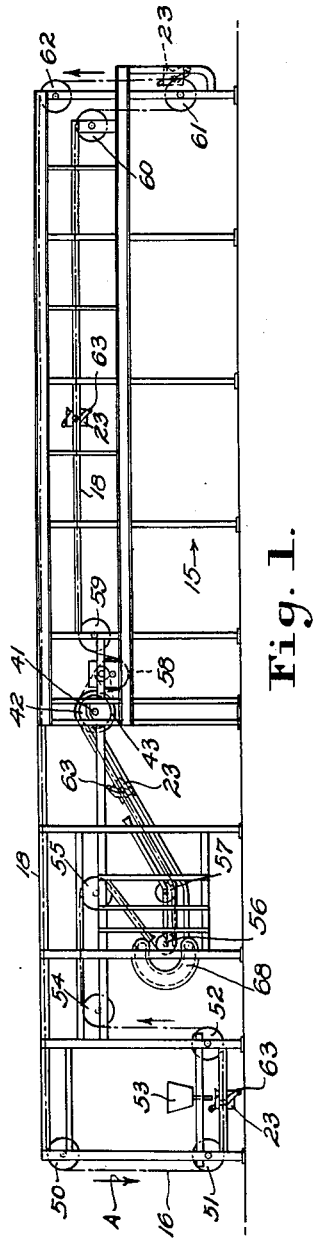
Inventor
Glenn W. Merritt
By W. S. McDowell
Attorney

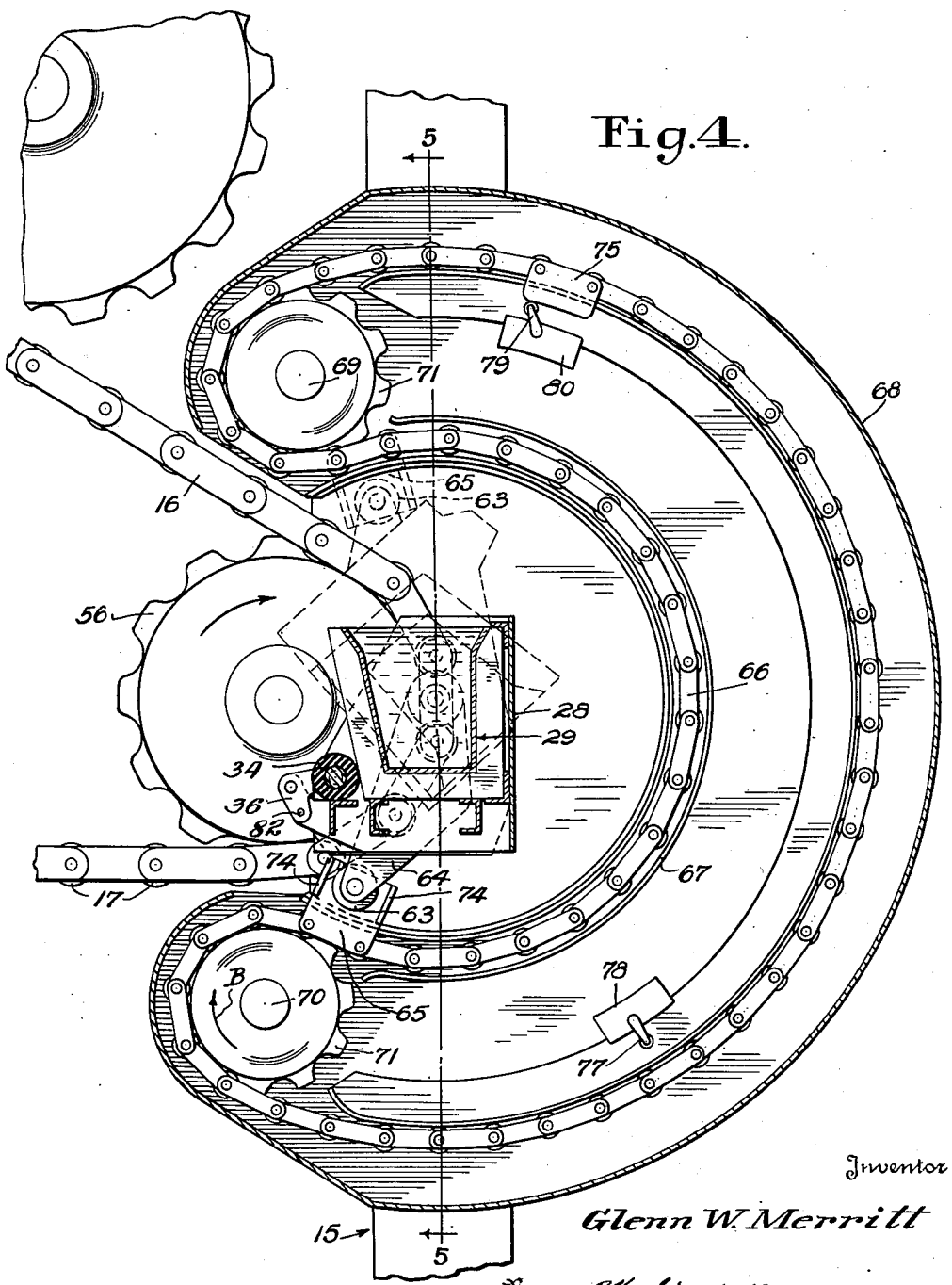

March 14, 1950 G. W. MERRITT 2,500,371
MOLDING MACHINE FOR CERAMIC WARE
Filed Jan. 2, 1948 5 Sheets-Sheet 3

Inventor
Glenn W. Merritt

By W. S. McDowell
Attorney

March 14, 1950 G. W. MERRITT 2,500,371
MOLDING MACHINE FOR CERAMIC WARE
Filed Jan. 2, 1948 5 Sheets-Sheet 4
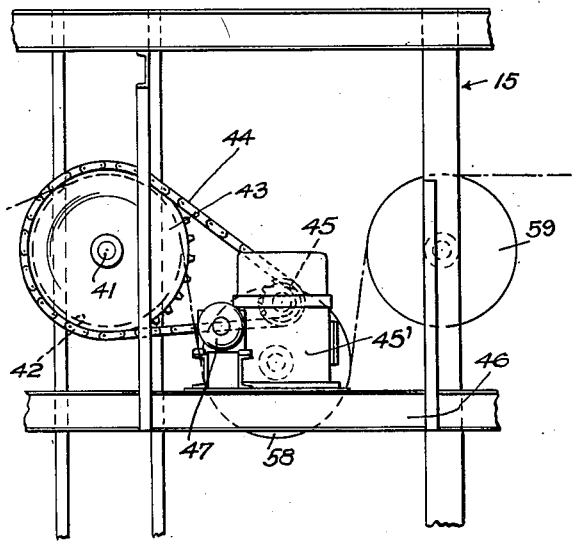
Fig. 6.
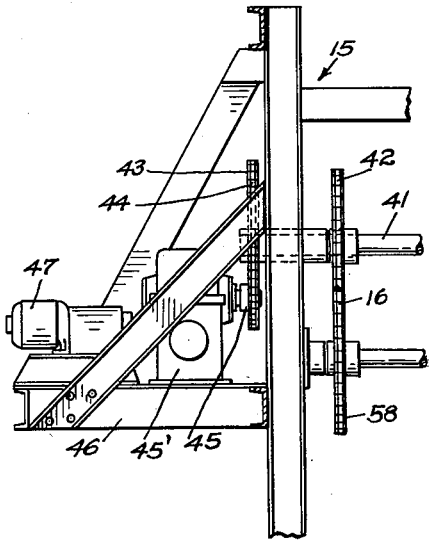
Fig. 7.
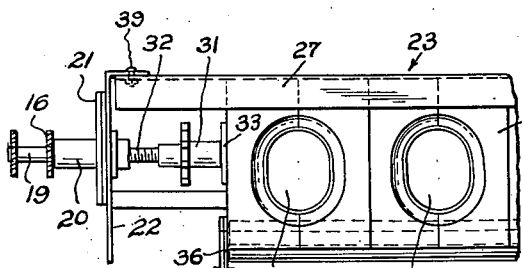
Fig. 8.
Fig. 9.
Fig. 10.
Inventor
Glenn W. Merritt
By W. S. McDowell
Attorney March 14, 1950  G. W. MERRITT  2,500,371
MOLDING MACHINE FOR CERAMIC WARE
Filed Jan. 2, 1948  5 Sheets-Sheet 5
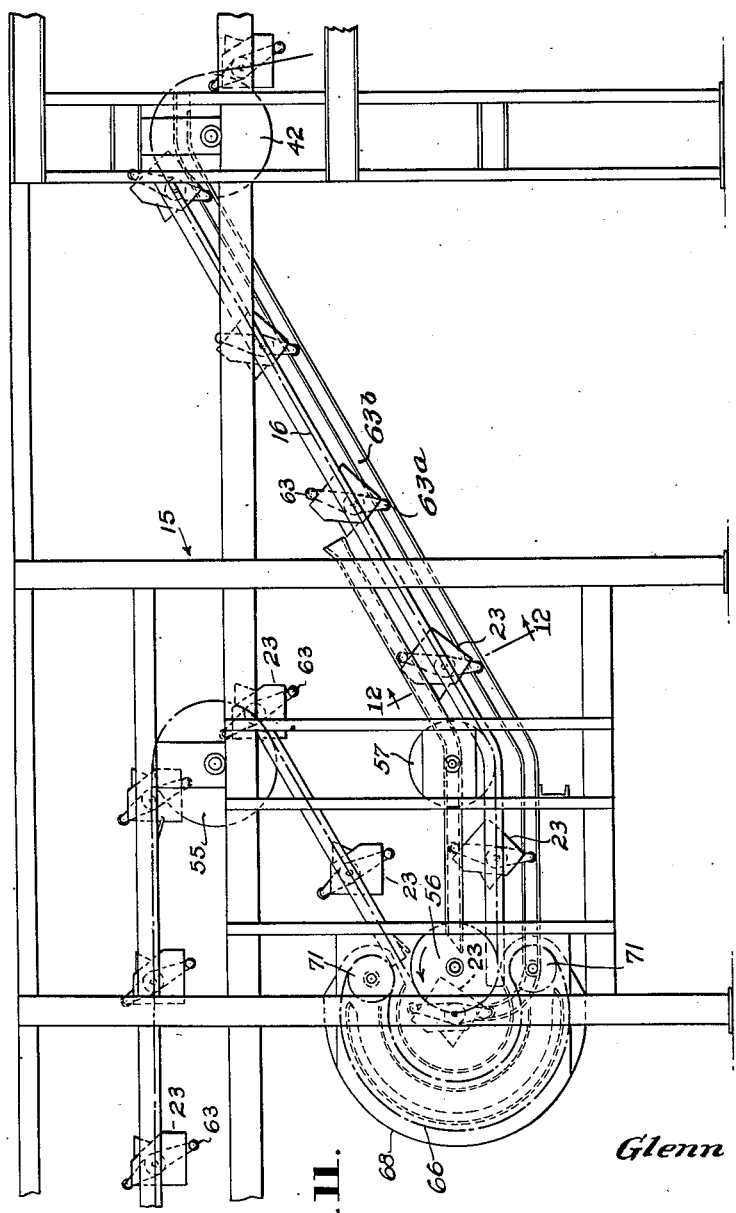
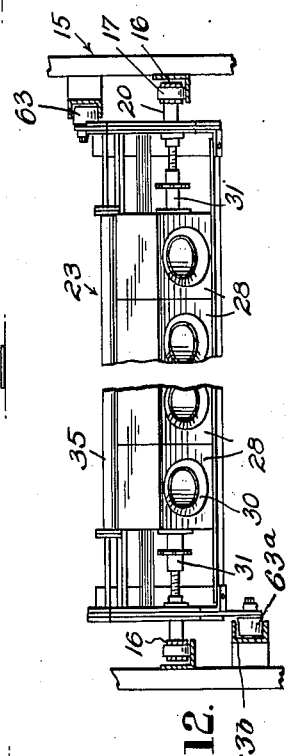
Inventor
Glenn W. Merritt
By W. S. McDowell
Attorney Patented Mar. 14, 1950

2,500,371

UNITED STATES PATENT OFFICE 2,500,371

MOLDING MACHINE FOR CERAMIC WARE

Glenn W. Merritt, Bowerston, Ohio, assignor to The Nolan Company, Bowerston, Ohio, a corporation of Ohio Application January 2, 1948, Serial No. 35

5 Claims. (Cl. 25—29)

This invention relates to molding machines and, more particularly, to molding machines of the conveyor type used in the casting or molding of ceramic articles of earthenware, such as pitchers, jugs or other hollow clay articles.

Such machines characteristically embody a plurality of pivotally movable mold-supporting devices which are carried by conveyor chains moving in a fixed orbit of travel, and wherein provision is made for filling the mold cavities with a slip comprising a liquid suspension of clay and other ingredients. Following introduction of the liquid slip into the molds, a portion of the slip is absorbed in the pores of the molds, which are usually formed of a material such as plaster of Paris, so that after a certain period of retention of the slip in the molds, there is produced on the cavity walls thereof a layer of solidified ceramic mixture. When the layer is of desired thickness, the excess liquid suspension is poured out of the mold cavities by pivotally swinging the mold-supporting devices to invert the open-topped molds and thereafter the molds are moved by the conveyor through a setting or drying zone in which the cast materials harden or set sufficiently so that the molds, at the end of the zone, may be opened and the cast articles removed therefrom for heat treatment and other operations.

Machines of this type dispense with the ordinary methods of pouring molds by hand operations and greatly expedite the process of manufacture of various types of ceramic articles as well as reducing production costs.

Generally stated, it is an object of the present invention to provide an improved casting machine of the character under consideration wherein sectional molds are clamped in closely related longitudinal order on a plurality of benches which are pivotally carried at longitudinally spaced intervals on a plurality of conveyor chains, improved means being provided for holding the molds on said benches so that the benches and molds may be inverted for the discharge of excess slip without dislodgement of the molds during the slip-discharging operation.

It is another object of the invention to provide appliances for holding a series of molds on a conveyor bench of such a molding machine and to so construct the appliances that the same may be quickly operated to release the molds in a convenient and facile manner at the ware-unloading station of the machine, whereby to permit of the separation of the molds and the removal of the cast articles therefrom.

A further object of the invention is to provide such a molding machine with an improved means for inverting the benches and the molds carried thereby at a determined position in the movement of the endless conveyor chains, and to maintain the molds so inverted for a definite period of time to insure proper and adequate drainage of the excess slip solution before the molds are returned to their normal upright positions and conveyed by the chains through a drying or setting zone to the unloading station.

Other objects of the invention and the various advantages and characteristics of the present construction will be apparent from a consideration of the following detailed description.

The invention consists in the several novel features which are hereinafter set forth and are more particularly defined by claims at the conclusion hereof.

In the drawings which accompany and form a part of this specification are disclosed and in which like numerals of reference denote corresponding parts throughout the several views:

Fig. 1 is a side view of a molding machine embodying the invention.

Fig. 2 is a front elevational view thereof;

Fig. 3 is a fragmentary front elevational view on a larger scale, disclosing one of the conveyor chains and associated mold benches;

Fig. 4 is a detail vertical longitudinal sectional view taken through the mold inverting portion of the machine and disclosing the mechanism for swinging the mold benches about their pivotal connections with their carrying chains in order to invert the molds to remove excess fluid therefrom;

Fig. 6 is a detail side elevational view of the mechanism for imparting power to the chain-driving shafts of the machine;

Fig. 7 is a side elevational view of the structure disclosed in Fig. 6;

Fig. 8 is a fragmentary top plan view of one of the conveyor benches with the sectional molds arranged thereon and disclosing the screw-actuated clamping means for retaining the molds in assembled relation on the bench;

Fig. 9 is a fragmentary front elevational view of the mechanism disclosed in Fig. 8;

Fig. 10 is a vertical transverse sectional view taken through the mold bench and one of the molds on the plane indicated by the line 10—10 of Fig. 9;

Fig. 11 is a detail side elevational view of the mold-inverting part of the conveyor mechanism;

Fig. 12 is a detail cross-sectional view on the line 12—12 of Fig. 11.

Figure 5:
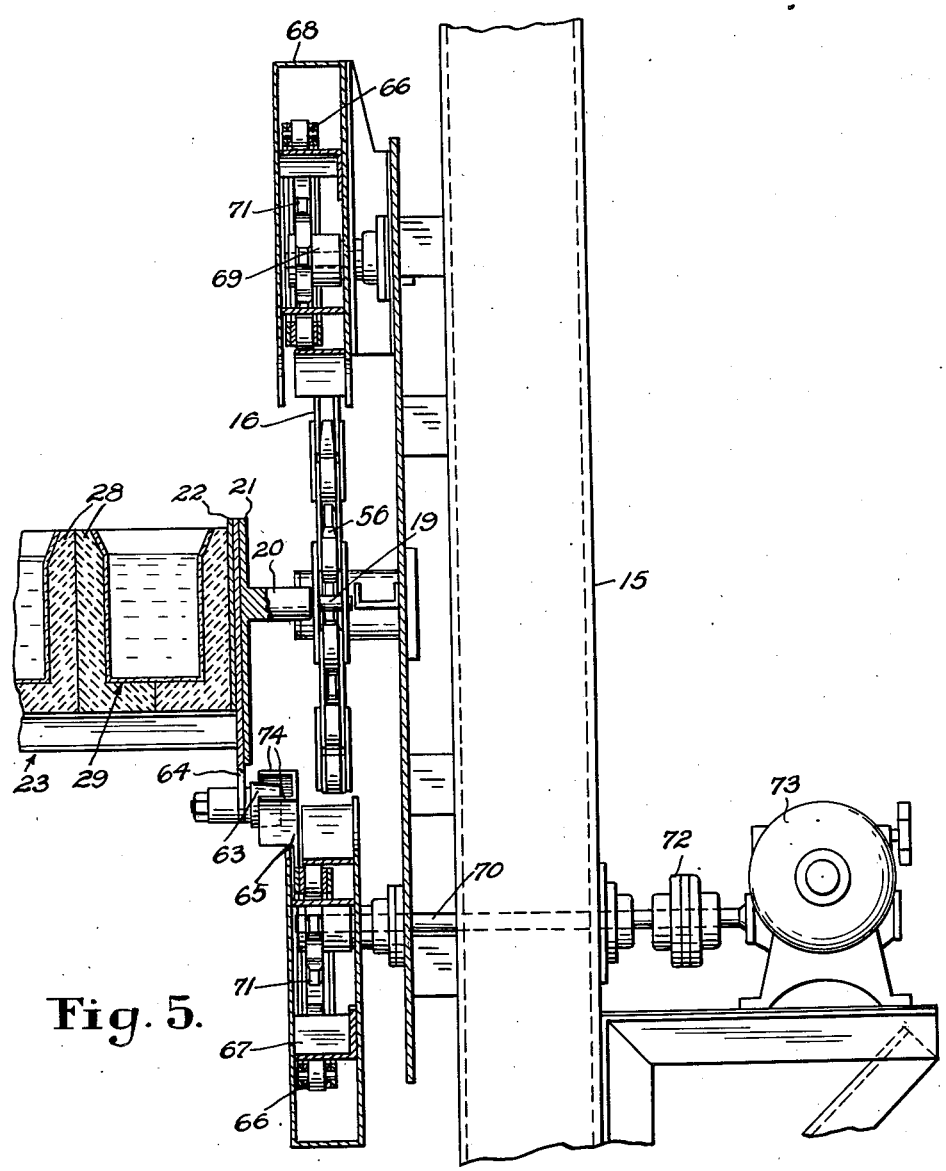
Fig. 5 is a vertical transverse sectional view taken through the machine on the plane indicated by the line 5—5 of Fig. 4.

Referring more particularly to the drawings, there is indicated at 15 a structural steel framework composed of interconnected vertical and horizontal members. These members, as will be described in detail hereinafter, are provided at suitable positions with transversely aligned bearings for the reception of shafts provided with sprocket wheels and around which pass a pair of transversely spaced endless chains 16. These chains are of the link type, having transverse pins carrying rollers 17 which engage with fixed guides 18 joined with the framework 15. The chains 16 comprise endless belts which travel generally longitudinally of the framework 15 and are confined to definite paths of travel by the arrangement of the frame-supported shaft-mounted sprockets.

At appropriately spaced longitudinal intervals, the spaced links of the chains are formed with openings for the reception of pivot pins or trunnions 19, which are formed with the outer ends of bosses 20, each of the latter being formed with a base plate 21 secured to the end walls 22 of a plurality of mold-supporting benches, designated generally by the numeral 23. In addition to the end walls 22, each of the benches 23 includes a back wall 24, base channels 25 and a parallel base angle 26, all of which being joined at their ends with the end walls 22 of each bench to constitute a rigid structure. Also, adjacent to its upper edge portion, each of the back walls 24 is provided with an adjustable angle member 27, as shown in Figs 8 and 10. By this construction, each of the benches spans the space between the chains 16 and is pivotally suspended from said chains for rocking or tilting movement, as is best illustrated in Fig. 5. Normally, the pivotal suspension of each bench is such that the same maintains its upright position together with the ceramic molds 28 arranged thereon.

These molds are of the usual type employed in pottery manufacture, each mold being split vertically to form two complemental sections, and these sections are formed from a water-absorbing material such as plaster of Paris. When the two sections of a given mold are placed side by side, as in Figs. 8 and 10, the same produce a mold cavity 29. This cavity is closed at its bottom and open at the top thereof, as at 30, for the introduction therein of a slip. The molds are assembled on each bench by placing the same on the base channels 25 with the flat upper surfaces of the molds in engagement with the angle member 27 and are held together longitudinally by means of the internally threaded nuts 31 which are rotatable on threaded posts 32 projecting inwardly from the end walls 22, the nuts having engagement with bearing plates 33. By rotating the nuts in one direction, the same apply end pressures to the molds contained on the bench, holding the latter against longitudinal movement, and maintaining the sections of the molds in assembled relationship.

Forward and upward movement of the molds is precluded by the provision of a swinging rod 34 on which is mounted a yieldable sleeve 35 of rubber or the like. The ends of each rod 34 are connected with links 36 which, in turn, are pivotally connected as at 37 with ears 38 carried by the frame structure of the bench. When the rods 34 are actively positioned, as shown in Fig. 10, the same exert a pressure forcing the molds inwardly and positioning the same securely against the angle member 27. The rubber sleeve 35 surrounding each of the rods 34 serves to protect the molds against injury and to engage uniformly each of the molds, even though the latter may vary slightly in their width dimensions. Likewise, the angle member 27 has its ends provided with fastening elements 39 which are receivable in elongated vertical slots 40 provided in the rear of the bench frame, so that the angle member may be adjusted vertically and thus adapted to the high dimensions of the molds. Through this arrangement, the molds are securely retained on their benches, the retaining means being such as to enable the molds to be rapidly assembled, firmly held together and conveniently removed or separated at the ware unloading position of the machine, the retaining means also locking the mold against displacement when the same are inverted, as will be presently described, to discharge excess slip material.

Journaled in the framework 15 is a transversely extending and horizontally disposed drive shaft 41. This shaft carries within the framework sprockets 42 over which the chains 16 pass and by which sprockets motion is imparted to the chains. The shaft 41 is driven by providing one end thereof, outside the framework, with a sprocket 43, over which passes an endless chain 44, the latter being also trained over a smaller sprocket 45 carried by the driven shaft of a geared speed-reducing mechanism, not shown, arranged in the housing indicated at 45', the latter being supported on the framework by means of the platform 46, see Figs. 6 and 7.

An electric motor 47, also mounted on the platform 46, has its armature shaft coupled with the speed-reducing gearing. Through the use of suitable switch controls, not shown, actuated by one of the chains 16, the motor 47 is started and stopped at definite intervals to impart intermittent motion to the conveyor chains 16.

At the front end of the framework, the latter carries upper and lower transversely journaled shafts 48 and 49, which carry sprockets 50 and 51 respectively, around which the chains 16 are trained, the chains moving downwardly between the sprockets as indicated by the arrow A in Fig. 1. After passing around the lower sprockets 51, the chains travel longitudinally and horizontally for passage around the sprockets indicated at 52. During the travel of the chains between the sprockets 50 and 52, the molds carried by the chains are brought into vertical registration with the slip-introducing means 53, which may be of any conventional construction. When in registration with the slip-introducing means, the molds remain at rest for a predetermined interval of time by interrupting the application of power to the chains. This allows the mold cavities to be filled with the slip solution and thereafter motion of the chains is again continued to advance the slip-filled molds around the sprockets 52, thence upwardly in a vertical direction for passage around sprockets 55 and then downwardly and angularly in a forward direction for passage around sprockets 56, the sprockets 56 being located in the zone of excess slip removal of the machine.

Following the tilting of the benches and the molds carried thereby to remove therefrom excess slip, the chains 16 pass from the sprocket 56 horizontally and rearwardly of the machine around sprockets shown at 57 and thence upwardly and angularly in a rearward direction for passage over the sprockets 42 and the drive shaft 41.

Close contact of the chains with the teeth of the sprockets 42 is obtained by sharply flexing the chains for passage around idler sprockets 58 and 59, the sprockets 58 being disposed in a plane lower than the sprockets 42 and 59. From the sprockets 59, chains pass rearwardly and longitudinally of the machine along the guides 18 to sprockets 60, and thence downwardly for passage around the sprockets 61 at the ware unloading station of the machine. After passing around the sprockets 61, the movement of the chains is interrupted so that the molds will dwell for a definite interval of time. During this interval, the molds are separated and the ware produced in the mold cavities is removed, the speed of travel of the conveyor chains being so regulated from the slip-introducing zone to the ware-unloading zone as to enable the clay mixture to dry and set sufficiently so that a workman by using ordinary care may lift the ware from the molds without injuring the form or structure thereof.

Following the removal of the formed ware, the molds are reassembled in properly clamped order on the benches and motion of the chains is resumed, the molds passing upwardly by the training of the chains around sprockets 62 located in the upper rear region of the machine framework. The chains and the molds then pass forwardly and longitudinally along the top of the machine to the sprockets 56. During this period of travel, the molds are caused to dry so that they will be in condition to receive a fresh supply of slip material from the slip-introducing means 53.

An important feature of the present invention resides in the construction of the mold-inverting mechanism disclosed in detail in Figs. 4 and 5. When each mold bench reaches the full line position disclosed in Fig. 4 during its travel around the sprockets 56, motion of the chains 16 is discontinued. Immediately prior to stopping the molds at this position, rollers 63 provided on the lower ends of brackets 64, forming a part of the end wall construction of the bench frames, are brought by the downward movement of the molds into registration with a dog 65 carried by an endless chain 66. This chain, which is of the link type, is mounted for travel in crescent-shaped guides 67 arranged in a correspondingly shaped housing 68 fixed to the frame structure 15 on one side thereof. The ends of the housing have journaled therein sprocket shafts 69 and 70 carrying sprockets 71, the teeth of which being in meshing engagement with the links of the chain 66. The shaft 70, as shown in Fig. 5, is coupled as at 72 with the shaft of a reversible electric motor 73.

When the movement of the molds is stopped during their passage around the sprockets 56 with the rollers 63 in registration with the bracket 64, and disposed between the laterally turned ears 74 of said dog, the motor 73 is energized to cause the sprocket 71 on the shaft 70 to turn in the direction indicated by the arrow B. With the conveyor chain 16 at rest, the movement of the chain 66 as a result of the energizing of the motor 73, causes the dog 65 to move from its full line position, as shown in Fig. 4, to the dotted line position. This results in rocking the mold bench and the row of molds clamped thereon from their full line positions, as shown in Fig. 4 to the dotted line positions. When the inverted or dotted line positions are reached, a bracket 75, carried by the chain 66 contacts the actuating arm 77 of a stationarily mounted switch 78 to interrupt the circuit, not shown, of the motor 73, thus arresting movement of the chain 66 with the molds in an inverted position.

Excess slip liquid is then discharged gravitationally from the molds and is deposited in a suitable container, not shown, for reuse in the system. After a certain period of dwell on the part of the chain 66, to allow for drainage of the excess slip from the molds, the motor 73 is again energized to cause rotation of its armature shaft in a reverse direction to that indicated by the arrow B in order to restore the dog 65 to its original full line position after the conveyor motor has been started and moved the molds in the over-turned positions to allow clearance for the dog 65 to return.

When the molds are inverted, rollers 63a, carried by the ends of the devices opposite to those carrying the rollers 63, enter the forward end of a frame-carried guide channel 63b. This channel is provided for the purpose of maintaining the molds in inverted positions after linear travel of the conveyor has been resumed, in order to allow topping or trimming of the solidified slip while the molds are in their over-turned positions. Thus the molds are so inverted during travel of the same around the sprockets 56, 57 and 42, as shown in Fig. 11. The molds thereafter travel, as previously described, to the unloading station of the machine where the initially formed ware is removed from the molds and transferred to a firing kiln or the like.

Except for the operation of the mold-inverting mechanism, the devices and molds are pivotally mounted on the conveyor chains so that they are suspended therefrom in normally upright positions, this being due to the fact that the pivotal axes provided by the pivot pins or trunnions 19 are disposed above the center of gravity of each device.

The molds 28, in this instance, are of the type provided with angular forward faces 81; otherwise, the molds are generally cubical in their external configuration. The inclination of the forward faces of the molds enables the yieldable sleeve 35 of the clamping rod 34 to be compressed upon initial contact with the mold faces, so that when in its final clamping position upward or releasing movement on the part of the rod will be resisted by the inclination of the mold faces, thus preventing accidental release of the molds.

A removable locking pin 32, passing through openings in one of the links 36 and ear 38, may also be employed to hold positively the roller 35 against accidental displacement.

It will be observed that the present invention provides a machine which is exceedingly efficient in operation and provides for the casting of ceramic ware at low cost by virtue of the fact that it is automatic and the ware is cast without manual manipulation.

I claim:

1. In a machine for molding hollow ceramic ware, a supporting structure, an endless conveyor supported on said structure, said conveyor embodying a pair of transversely spaced guide-carried chains, means for imparting intermittent movement to said chains, a plurality of mold-carrying benches pivotally connected at their ends to and disposed at longitudinally spaced intervals on said chains, molds carried by said benches, means for introducing a fluid slip into said molds, means spaced from said slip-introducing means for discharging excess quantities of the fluid slip from said molds by tilting said benches, said tilting means embodying a shaft mounted on said supporting structure, sprockets carried by said shaft and around which said chains are trained, an endless tilting chain, an arcuate guide on said supporting structure in which said tilting chain operates, sprockets at the ends of said arcuate guide around which said inverter chain is trained, a laterally directed projection on each of said benches disposed below the pivotal mountings for said benches, means carried by said tilting chains engageable with the lateral projections of said mold benches when the latter are in registration with the shaft-carried sprockets, and means for moving said tilting chain first in one direction and then the other to rock said benches to a mold inverting position and back again to normal position when said conveyor chains are at rest.

2. In a machine for molding ceramic ware, a supporting structure, an endless conveyor supported on said structure and embodying a pair of transversely spaced guide-mounted chains, means for imparting intermittent movement to said chains, a plurality of mold-carrying benches pivotally mounted at longitudinally spaced intervals on said chains, clamping means carried by said benches for retaining against displacement on each thereof a row of longitudinally aligned sectional molds, a plurality of molds detachably carried by said clamping means, said molds when assembled each having an internal slip-receiving cavity open at the top of the mold means for inverting said benches and their molds to discharge excess slip fluid from the mold cavities, said means embodying a shaft mounted on said supporting structure, sprockets carried by said shaft and around which said chains are trained, an endless inverter chain, an arcuate guide for said inverter chain, said guide having an axial center displaced laterally with respect to the longitudinal axis of said shaft and disposed for registration with the axes of the pivotal connections between the mold benches and conveyor chains during travel of the benches around said sprockets, sprockets at the ends of said arcuate guide around which the inverter chain is trained, reversible intermittently operating power-driven means for moving said inverter chain along said arcuate guide, first in one direction and then in the other, a lateral projection extending from an end of each of said benches in offset relation to its pivotal mounting, and means carried by said inverter chain engageable with the projection of a mold bench when the latter is in registration with said shaft-carried sprockets when the conveyor chains are at rest for rocking said benches to a mold-inverting position and thereafter restoring a tilted bench to its normal position.

3. In a machine for molding articles of pottery, a supporting structure, an endless conveyor arranged on said structure and embodying a pair of transversely spaced guide-carried chains, means for imparting intermittent movement to said chains, mold benches pivotally mounted at longitudinally spaced intervals on said chains, clamping means carried by said benches for retaining against displacement thereon longitudinally aligned sectional molds, each of said molds when clamped on said benches having an internal slip-receiving cavity open at its top, means for introducing a fluid clay-containing mixture into the cavities of said molds to produce therein a clay lining having the shape of the mold cavities, means carried by said supporting structure and spaced from the clay mixture-introducing means for inverting said benches and the molds carried thereby to discharge excess fluid from the mold cavities following the formation of said linings, said inverting means embodying an arcuately arranged endless chain carried by said supporting structure, a roller projecting laterally from one end of each of said benches, and a dog carried by said inverting chain provided with spaced ears for the reception of said projection and operative when said conveyor chain is at rest to turn a mold bench engaged therewith about its pivotal connections with said conveyor chains to cause the molds on the bench to assume a tilted position providing for the discharge of excess mixture fluid from the cavities of said molds.

4. A mold bench for machines employed in molding ceramic articles, comprising an elongated frame having bottom, end and back walls, said frame being formed to receive a plurality of longitudinally aligned molds, screw threaded means carried by the end walls of said frame for applying compressive forces to a row of molds arranged on said frame to retain said molds against longitudinal displacement, a pivotally movable rod member arranged longitudinally at the front of said frame adjacent to the bottom thereof, said rod member being rockable into engagement with the front faces of a row of molds arranged on said bench to retain the molds against displacement transversely of said frame, and a covering of compressible material surrounding said rod member.

5. A mold bench for machines employed in molding ceramic articles, comprising an elongated frame having bottom, end and back walls, said frame being formed to receive a plurality of longitudinally aligned molds, screw threaded means carried by the end walls of said frame for applying compressive forces to a row of molds arranged on said frame to retain said molds against longitudinal displacement, a pivotally movable rod member arranged longitudinally at the front of said frame adjacent to the bottom thereof, said rod member being rockable into engagement with the front faces of a row of molds arranged on said bench to retain the molds against displacement transversely of said frame, and a vertically adjustable angle member carried by the back wall of said frame contiguous to the top thereof for engagement with the upper surfaces of said molds to retain the latter against vertical displacement on said bench.

GLENN W. MERRITT.

REFERENCES CITED

The following references are of record in the file of this patent:

UNITED STATES PATENTS

| Number | Name | Date |
| --- | --- | --- |
| 777,445 | Stevenson | Dec. 13, 1904 |
| 1,488,973 | Brookes | Apr. 1, 1924 |
| 1,631,839 | Terry | June 7, 1927 |
| 1,935,088 | Greene | Nov. 14, 1933 |
| 2,294,476 | Mooney | Sept. 1, 1942 |